United States Patent
Tong

(10) Patent No.: US 11,697,317 B2
(45) Date of Patent: Jul. 11, 2023

(54) MODULAR ELECTRONIC DAMPING CONTROL

(71) Applicant: Fox Factory, Inc., Duluth, GA (US)

(72) Inventor: Ivan Tong, San Diego, CA (US)

(73) Assignee: Fox Factory, Inc., Duluth, GA (US)

( * ) Notice: Subject to any disclaimer, the term of this patent is extended or adjusted under 35 U.S.C. 154(b) by 76 days.

(21) Appl. No.: 17/184,512

(22) Filed: Feb. 24, 2021

(65) Prior Publication Data

US 2021/0252933 A1 Aug. 19, 2021

Related U.S. Application Data

(63) Continuation of application No. 16/144,918, filed on Sep. 27, 2018, now Pat. No. 10,933,710.

(Continued)

(51) Int. Cl.
*B60G 1/00* (2006.01)
*B60G 17/0165* (2006.01)
(Continued)

(52) U.S. Cl.
CPC ......... *B60G 17/0165* (2013.01); *B60G 13/08* (2013.01); *B60G 17/018* (2013.01);
(Continued)

(58) Field of Classification Search
CPC .. B60G 17/0165; B60G 13/08; B60G 17/018; B60G 17/01908; B60G 17/08; B60G 2202/24; B60G 2204/61; B60G 2206/011; B60G 2206/99; B60G 2300/07; B60G 2300/124; B60G 2300/27; B60G 2400/82; B60G 2400/84; B60G 2401/142; B60G 2500/10; B60G 2600/042;
(Continued)

(56) References Cited

U.S. PATENT DOCUMENTS 3,986,118 A   10/1976 Madigan
5,952,823 A   9/1999 Sprecher et al.
(Continued)

FOREIGN PATENT DOCUMENTS

CN   201784426 U   4/2011
DE   102016222396 A1   5/2018
(Continued)

OTHER PUBLICATIONS

Extended European Search Report for EP Application 20192005.5 dated Jul. 19, 2021, 14 Pages.
(Continued)

*Primary Examiner* — Tyler J Lee
*Assistant Examiner* — Tiffany P Ohman

(57) ABSTRACT

A modular electronic damping control system is described and includes a damping component located at a vehicle suspension location. The modular electronic damping control system also includes a control system configured to control the damping component, and determine the type of damping component present. Also, the control system is configured to automatically tune a vehicle's suspension based on the type of damping component present, and automatically monitor the damping component and determine when a change has been made to the damping component so that the control system can then automatically re-tune the vehicle's suspension based on the change to the damping component.

14 Claims, 5 Drawing Sheets

Related U.S. Application Data

(60) Provisional application No. 62/566,083, filed on Sep. 29, 2017.

(51) Int. Cl.
| | |
|---|---|
| *F16F 9/46* | (2006.01) |
| *B60G 17/018* | (2006.01) |
| *B60G 13/08* | (2006.01) |
| *B60G 17/019* | (2006.01) |
| *B60G 17/08* | (2006.01) |
| *F16F 9/19* | (2006.01) |
| *F16F 9/512* | (2006.01) |

(52) U.S. Cl.
CPC ....... *B60G 17/01908* (2013.01); *B60G 17/08* (2013.01); *F16F 9/19* (2013.01); *F16F 9/46* (2013.01); *F16F 9/5126* (2013.01); *B60G 2202/24* (2013.01); *B60G 2204/61* (2013.01); *B60G 2206/011* (2013.01); *B60G 2206/99* (2013.01); *B60G 2300/07* (2013.01); *B60G 2300/124* (2013.01); *B60G 2300/27* (2013.01); *B60G 2400/82* (2013.01); *B60G 2400/84* (2013.01); *B60G 2401/142* (2013.01); *B60G 2500/10* (2013.01); *B60G 2600/042* (2013.01); *B60G 2600/084* (2013.01); *B60G 2600/182* (2013.01); *B60G 2600/184* (2013.01); *B60G 2600/1877* (2013.01); *B60G 2600/20* (2013.01); *B60G 2600/21* (2013.01); *B60G 2600/704* (2013.01); *B60G 2800/87* (2013.01)

(58) Field of Classification Search
CPC ........ B60G 2600/084; B60G 2600/182; B60G 2600/184; B60G 2600/1877; B60G 2600/20; B60G 2600/21; B60G 2600/704; B60G 2800/87; F16F 9/19; F16F 9/46; F16F 9/5126

See application file for complete search history.

(56) References Cited

U.S. PATENT DOCUMENTS

| | | | |
|---|---|---|---|
| 7,374,028 | B2 | 5/2008 | Fox |
| 8,550,223 | B2 | 10/2013 | Cox et al. |
| 8,627,932 | B2 | 1/2014 | Marking |
| 8,857,580 | B2 | 10/2014 | Marking |
| 9,033,122 | B2 | 5/2015 | Ericksen et al. |
| 9,120,362 | B2 | 9/2015 | Marking |
| 9,239,090 | B2 | 1/2016 | Marking et al. |
| 9,353,818 | B2 | 5/2016 | Marking |
| 2011/0241299 | A1 | 10/2011 | Harada et al. |
| 2012/0186922 | A1 | 7/2012 | Battlogg et al. |
| 2013/0328277 | A1 | 12/2013 | Ryan et al. |
| 2014/0125018 | A1 | 5/2014 | Brady et al. |
| 2014/0297117 | A1 | 10/2014 | Near et al. |
| 2014/0375006 | A1 | 12/2014 | Jenkins |
| 2015/0057885 | A1 | 2/2015 | Brady et al. |
| 2018/0134107 | A1 | 5/2018 | Von Holst et al. |
| 2018/0141543 | A1 | 5/2018 | Krosschell et al. |
| 2019/0100068 | A1 | 4/2019 | Tong |

FOREIGN PATENT DOCUMENTS

| | | |
|---|---|---|
| EP | 2357098 A2 | 8/2011 |
| EP | 2567839 A2 | 3/2013 |
| EP | 3075581 A1 | 10/2016 |
| WO | 2016118887 A1 | 7/2016 |

OTHER PUBLICATIONS

Germany Examination Report for DE102018007733.2 dated Nov. 11, 2020, 4 Pages.
UK Search Report for GB1815990.5 dated Mar. 11, 2019, 3 Pages.
Extended European Search Report for EP Application 18197892.5 dated Jun. 5, 2019, 9 pages.

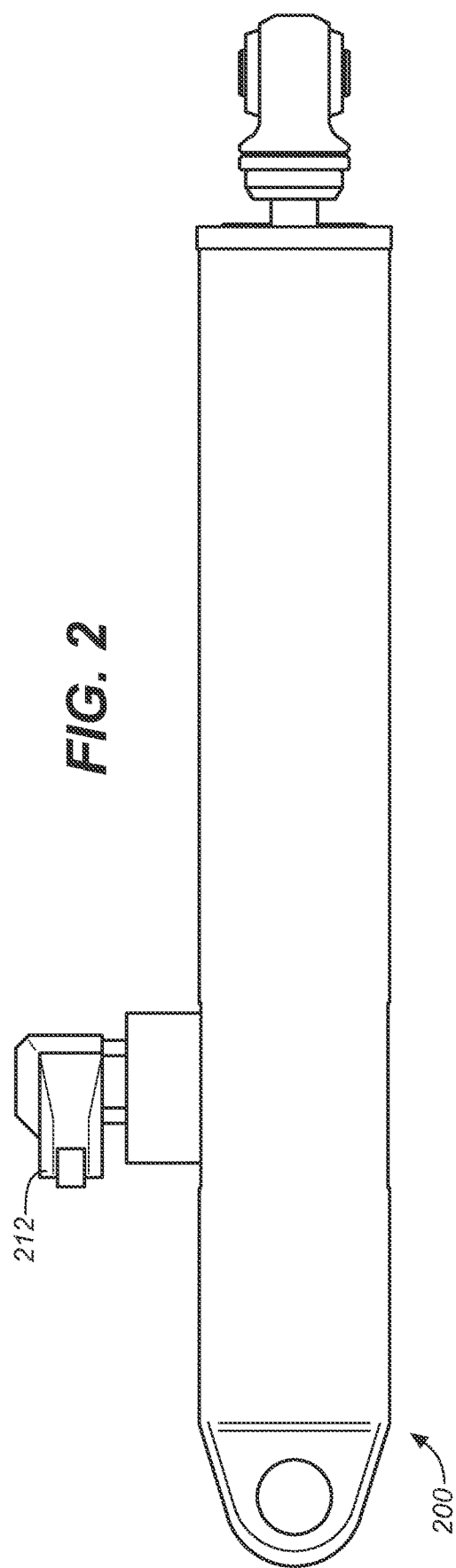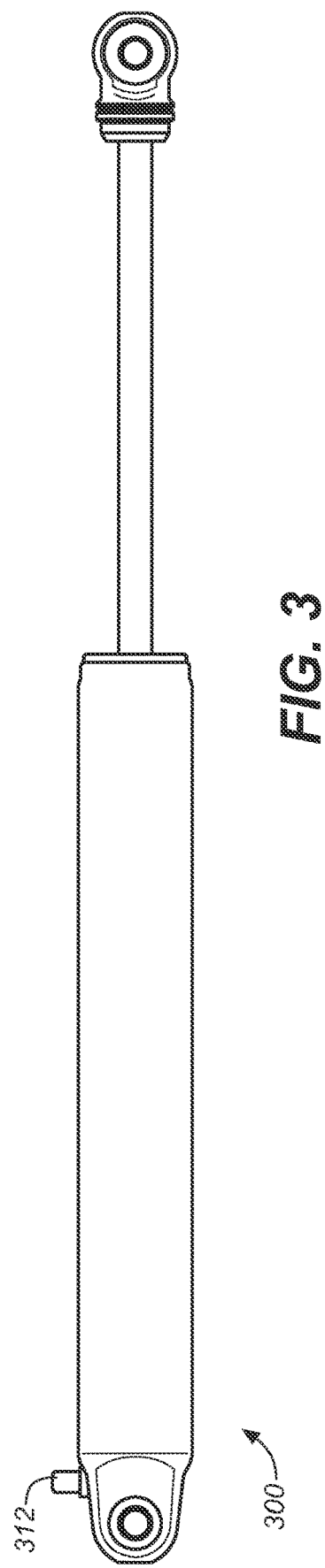

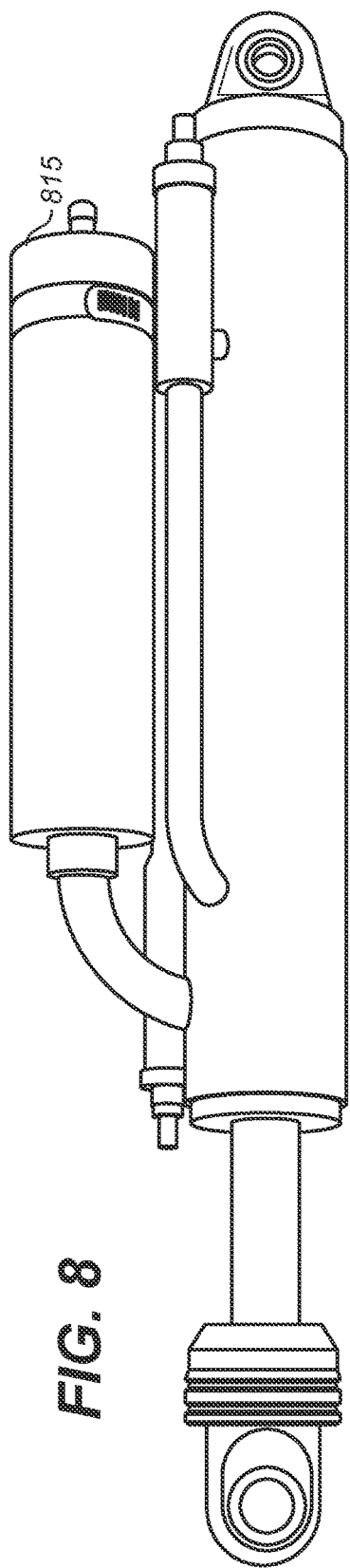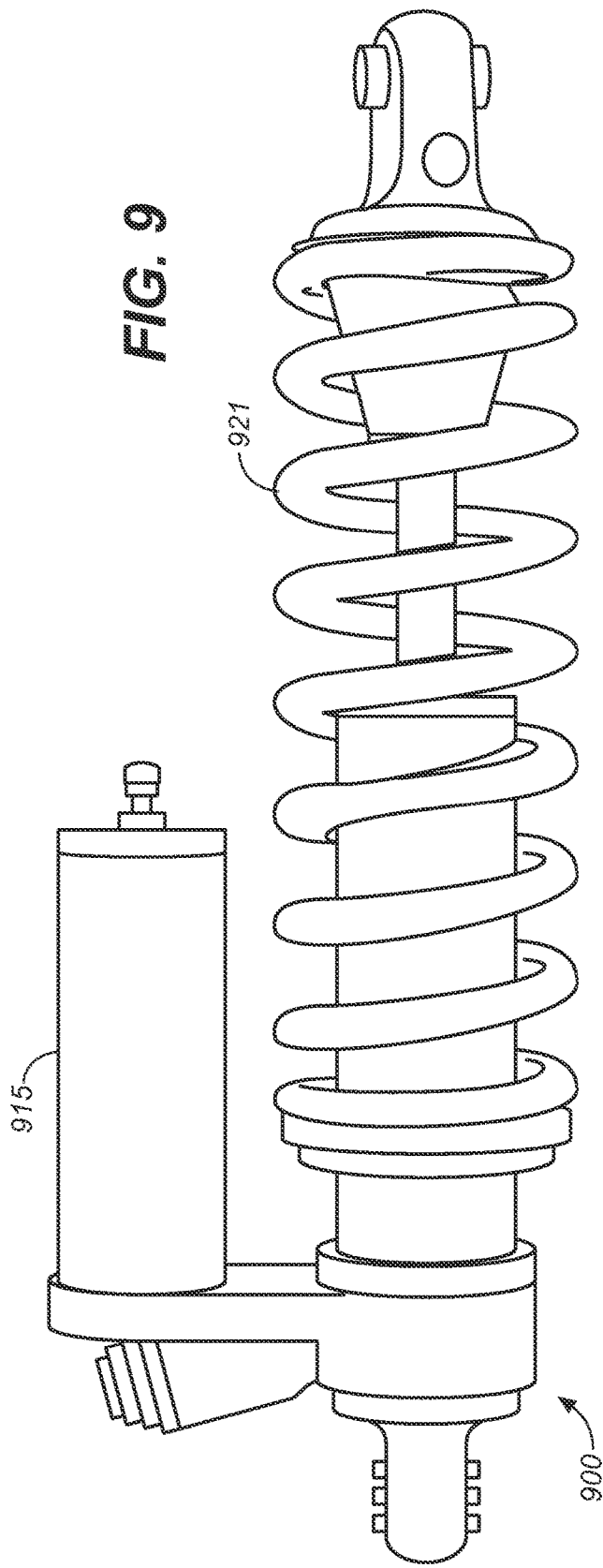

MODULAR ELECTRONIC DAMPING CONTROL

CROSS REFERENCE

This application is a continuation of and claims the benefit of and claims priority to co-pending U.S. Provisional patent application Ser. No. 16/144,918, filed on Sep. 27, 2018, entitled "MODULAR ELECTRONIC DAMPING CONTROL" by Ivan Tong, and assigned to the assignee of the present application, the disclosure of which is hereby incorporated herein by reference in its entirety.

The application Ser. No. 16/144,918 claims priority to and the benefit of U.S. Provisional Patent Application 62/566,083 filed on Sep. 29, 2017, entitled "MODULAR ELECTRONIC DAMPING CONTROL" by Ivan Tong, and assigned to the assignee of the present application, the disclosure of which is hereby incorporated herein by reference in its entirety.

FILED OF THE INVENTION

Embodiments of the present technology relate generally to damping systems used in vehicle suspension.

BACKGROUND

Vehicle suspension systems typically include a spring component or components and a dampening component or components. Typically, mechanical springs, like helical springs are used with some type of viscous fluid-based dampening mechanism and the two are mounted functionally in parallel. In some instances features of the damper or spring are user-adjustable.

BRIEF DESCRIPTION OF THE DRAWINGS

Aspects of the present invention are illustrated by way of example, and not by way of limitation, in the accompanying drawings, wherein:

FIG. 2 is a perspective view of an in-line damper with dependent compression and rebound adjust for use in the modular electronic damping control system, in accordance with an embodiment.

FIG. 3 is a perspective view of an in-line damper for use in the modular electronic damping control system, in accordance with an embodiment.

FIG. 8 is a perspective view of a damper with a piggyback for use in the modular electronic damping control system, in accordance with an embodiment.

FIG. 9 is a perspective view of a damper with a piggyback and a spring for use in the modular electronic damping control system, in accordance with an embodiment.

Figure 1:
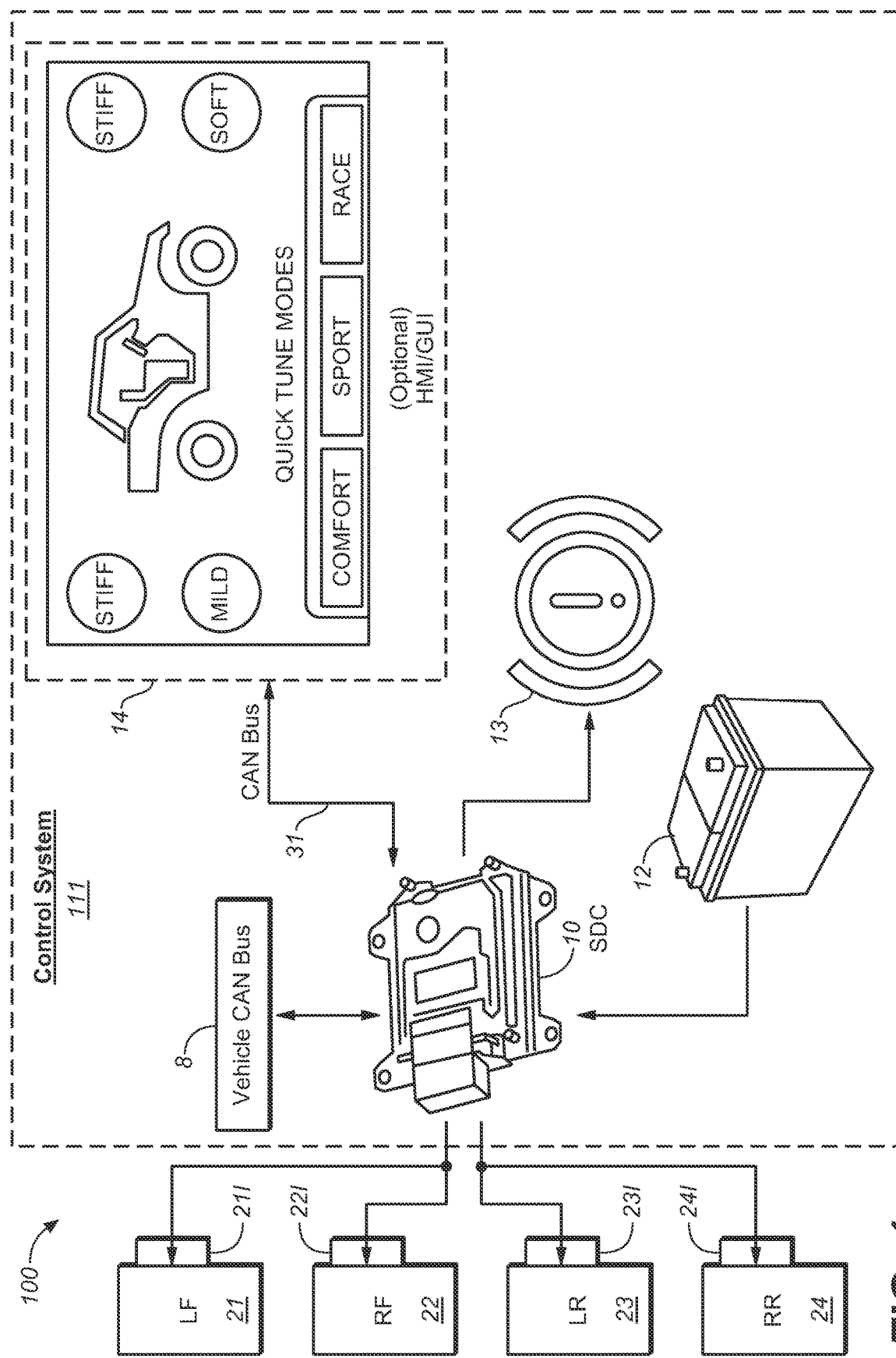
FIG. 1 is a block diagram of a modular electronic damping control system, in accordance with an embodiment.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, objects, and circuits have not been described in detail as not to unnecessarily obscure aspects of the present disclosure.

Overview of Discussion

This patent application describes embodiments of the present claimed invention in the context of a modular electronic damping control system. By being modular, the electronic damping control system is capable of determining a type of damping component at each vehicle wheel suspension location and automatically tune a vehicle suspension based on the determined type of damping components at each vehicle wheel suspension location. In addition, the control system automatically monitors the plurality of damping components and determines when a change has been made to one or more of the plurality of damping components. When it is determined that a change to one or more of the plurality of damping components has occurred, the control system automatically re-tunes the vehicle suspension based on the change of one or more of the plurality of damping components.

Further, because the electronic damping control system is modular, significant cost savings can be attained. The cost savings can be found at the vehicle manufacturer level and the consumer level. For example, the vehicle manufacturer can provide a number of different dampers that can be interchanged within the present modular electronic damping control system. The vehicle manufacturer can sell vehicles at a lower price with lower cost dampers that work well in light duty environments (introductory vehicles, light off-road conditions, etc.). The vehicle manufacturer can also offer vehicles for sale at a higher price with midrange dampers that work well in medium duty environments (e.g., weekend off-roading, family adventures, etc.). The vehicle manufacturer can additionally offer vehicles for sale at a premium price with high end dampers that work well in extreme duty environments, such as on or off-road racing (e.g., trophy vehicles).

Moreover, because of the interchangeable and automatic recognition of the dampers on the vehicle, the modular electronic damping control system provides significant opportunities for both manufacturer and aftermarket modification of the vehicle. For example, embodiments of the present invention enable a customer to purchase a vehicle with introductory dampers and then upgrade to medium dampers or high end dampers to obtain desired performance characteristics. Moreover, embodiments of the present electronic damping control system enable the customer to simply replace the current or existing dampers with new replacement dampers, and, in various embodiments of the present invention, the capabilities of the new replacement dampers are automatically determined by the present electronic damping control system. In such an embodiment, the capabilities of the new replacement dampers are automatically introduced into the system. Such an introduction, in various embodiments, further includes the availability of additional modes presented on an operator display such as a graphical user interface (GUI) or human machine interface (HMI). Additionally, in various embodiments, the present claimed invention enables operation of previously unavailable modes in a switch environment, automatic increases in performance of the vehicle, and the like.

DETAILED DISCUSSION

Referring now to FIG. 1, a block diagram of a modular electronic damping control system 100 is shown in accordance with an embodiment. Modular electronic damping control system 100 includes a plurality of damping components (hereinafter plurality of dampers 21-24) and a control system 111.

In one embodiment, there is at least one damper, of the plurality of dampers 21-24, located at each of a vehicle wheel suspension location. For example, damper 21 at the left front, damper 22 at the right front, damper 23 at the left rear, and damper 24 at the right rear.

In one embodiment, the plurality of dampers 21-24 are selected from damper types such as, but not limited to, an in-line damper, a piggyback damper, a compression adjust only damper, a rebound adjust only damper, an independent compression and rebound adjust damper, a dependent compression and rebound adjust single-valve damper, and the like. Additionally, in the various embodiments of the present invention, modular electronic damping control system 100 may include, or operate in conjunction with, manual dampers, active dampers, passive dampers, or any combination of such types of dampers. In the following discussion, the term "active", as used when referring to a valve or damping component, means adjustable, manipulatable, etc., during typical operation of the valve. For example, an active valve can have its operation changed to thereby alter a corresponding damping characteristic from a "soft" damping setting to a "firm" damping setting by, for example, adjusting a switch in a passenger compartment of a vehicle. Additionally, it will be understood that in some embodiments, an active valve may also be configured to automatically adjust its operation, and corresponding damping characteristics, based upon, for example, operational information pertaining to the vehicle and/or the suspension with which the valve is used. Similarly, it will be understood that in some embodiments, an active valve may be configured to automatically adjust its operation, and corresponding damping characteristics, to provide damping based upon received user input settings (e.g., a user-selected "comfort" setting, a user-selected "sport" setting, and the like). Additionally, in many instances, an "active" valve is adjusted or manipulated electronically (e.g., using a powered solenoid, or the like) to alter the operation or characteristics of a valve and/or other component. As a result, in the field of suspension components and valves, the terms "active" and "electronic" are often used interchangeably.

In the following discussion, the term "manual" as used when referring to a valve or damping component means manually adjustable, physically manipulatable, etc., without requiring disassembly of the valve, damping component, or suspension damper which includes the valve or damping component. In some instances, the manual adjustment or physical manipulation of the valve, damping component, or suspension damper, which includes the valve or damping component, occurs when the valve is in use. For example, a manual valve may be adjusted to change its operation to alter a corresponding damping characteristic from a "soft" damping setting to a "firm" damping setting by, for example, manually rotating a knob, pushing or pulling a lever, physically manipulating an air pressure control feature, manually operating a cable assembly, physically engaging a hydraulic unit, and the like. For purposes of the present discussion, such instances of manual adjustment/physical manipulation of the valve or component can occur before, during, and/or after "typical operation of the vehicle".

Further, in the following discussion, the term "passive", as used when referring to a valve or damping component, means fixed or not changeable during typical operation of the valve. It will be understood that in some instances, a passive valve or component can be, for example, manually disassembled, reconfigured to have a new or different operational characteristic (e.g., by replacing or adjusting an existing shim stack to vary the damping characteristics corresponding to the valve or component), and then returned to use. For purposes of the present discussion, such instances of adjustment to the valve or component are not described as occurring "during typical operation of the vehicle". Further, even though such valves or components can ultimately have their operational characteristics altered, such valves or components are described, in the present discussion, as "passive". A plurality of different damper 21-24 types is shown and described in the discussion of FIGS. 2-9.

Although modular electronic damping control system 100 is shown as interacting with four dampers (i.e., plurality of dampers 21-24 of FIG. 1) such as would be likely found in a four wheeled vehicle suspension configuration, it should be appreciated that the technology is well suited for application in other vehicles with different suspension configurations. The different configurations can include a two wheel suspension configuration like that of a motorcycle; a one, two or three "wheel" suspension configuration like that of a snowmobile, trike, or boat, a plurality of dampers at each of the damper suspension locations such as is often found in off-road vehicles, UTVs, powersports vehicles, heavy trucking vehicle, recreational vehicles (RVs), agriculture vehicles, maritime vehicles, and the like. The use of a single damper in a four suspension location configuration, as shown in FIG. 1, is provided merely as one implementation example of the various embodiments of the present invention. As stated above, various embodiments of the present modular electronic damping control system 100 may include, or operate in conjunction with, manual dampers, active dampers, passive dampers, or any combination of such types of dampers. For purposes of the following discussion, various embodiments described below will refer to the use of at least one active damper with, or as a part of, the present modular electronic damping control system 100.

Referring to FIG. 1, an embodiment of a control system 111 interacting with plurality of dampers 21-24 of the present invention is shown. FIG. 1 depicts a control system 111 which includes a damping controller. It will be understood that in some embodiments, control system 111 resides on, or within, a vehicle (not shown) to which one or more of plurality of dampers 21-24 are coupled. In one embodiment, damping controller is comprised of a suspension damping control (SDC) 10. Referring still to FIG. 1, control system 111 further includes vehicle Controller Area Network (CAN) bus 8, CAN Bus 31 to an optional HMI and/or GUI (HMI/GUI 14), warning 13, and a power source, battery 12.

In one embodiment, CAN bus 8 enables signals such as vehicle conditions and various other inputs to be transmitted from the vehicle to SDC 10. Additionally, in one embodiment, CAN bus 31 enables signals to be transmitted between SDC 10 and HMI/GUI 14. In various other embodiments of the present invention, control system 111 receives power from the vehicle in lieu of, or in addition to, using battery 12. It should be appreciated that in other embodiments of the present invention, one or more components shown within control system 111, in FIG. 1, would be located outside of control system 111. Similarly, in various other embodiments of the present invention, additional components would be located within control system 111.

With reference still to FIG. 1, in one embodiment, SDC 10, of modular electronic damping control system 100, includes a processor, hidden inside SDC 10. In operation, both compression and rebound fluid (such as, for example, hydraulic fluid) flows through independent, sophisticated, multistage blended circuits, which reside in SDC 10, to maximize suspension control. In one such an embodiment, SDC 10 will control each of plurality of dampers 21-24 located at each respective vehicle wheel suspension location, determine a type of damping component at each vehicle wheel suspension location (as stated above, modular electronic damping control system 100 may include, or operate in conjunction with, manual dampers, active dampers, passive dampers, or any combination of such types of dampers), automatically tune a vehicle suspension based on the determined type of damping components at each vehicle wheel suspension location, automatically monitor plurality of dampers 21-24 and determine when a change has been made to one or more of plurality of dampers 21-24, and automatically re-tune the vehicle suspension based on the change to one or more of plurality of dampers 21-24.

As an example, in embodiments of the present invention, SDC 10 is hydraulically coupled to each of plurality of dampers 21-24 via an interface 22I-24I, respectively, located at each of plurality of dampers 21-24. In one embodiment, damper 21 includes an interface 21I such as, for example, a port through which damping fluid can be added to or removed from a damping chamber of damper 21. In such an embodiment, SDC 10 tunes or adjusts the damping characteristics of damper 21, by adding damping fluid into, or removing damping fluid from, damper 21 through interface 21I. Similarly, in one embodiment, damper 22 includes an interface 22I such as, for example, a port through which damping fluid can be added to or removed from a damping chamber of damper 22. In such an embodiment, SDC 10 tunes or adjusts the damping characteristics of damper 22, by adding damping fluid into, or removing damping fluid from, damper 22 through interface 22I. Similarly, in another embodiment, damper 23 includes an interface 23I such as, for example, a port through which damping fluid can be added to or removed from a damping chamber of damper 23. In such an embodiment, SDC 10 tunes or adjusts the damping characteristics of damper 23, by adding damping fluid into, or removing damping fluid from, damper 23 through interface 23I. Similarly, in yet another embodiment, damper 24 includes an interface 24I such as, for example, a port through which damping fluid can be added to or removed from a damping chamber of damper 24. In such an embodiment, SDC 10 tunes or adjusts the damping characteristics of damper 24, by adding damping fluid into, or removing damping fluid from, damper 24 through interface 24I.

In various embodiments, SDC 10, of modular electronic damping control system 100, independently controls the damping characteristics of each of plurality of dampers 21-24. In some embodiments of the present invention, SDC 10 will remotely control operation of at least one remotely-adjustable valving component disposed within at least one of plurality of dampers 21-24 and thereby adjust the damping characteristics for that at least one of plurality of dampers 21-24. Furthermore, in some embodiments of the present invention, SDC 10 will control the flow of damping fluid (e.g., hydraulic fluid) into and out of at least one of plurality of dampers 21-24 and thereby adjust the damping characteristics for that at least one of plurality of dampers 21-24. In various other embodiments of the present invention, SDC 10 will use a combination of controlling operation of at least one valving component within at least one of plurality of dampers 21-24, and controlling the flow of damping fluid into and out of at least one of plurality of dampers 21-24 to control and/or adjust the damping characteristics for that at least one of plurality of dampers 21-24. In one embodiment, the damping characteristic of at least one of plurality of dampers 21-24 is achieved varying a damping fluid flow rate through an inlet or outlet passage within the active valve. See, as an example, the electronic valve of FIGS. 2-4 of U.S. Pat. No. 9,353,818 which is incorporated by reference herein, in its entirety.

In some embodiments of the present invention, the damping characteristic of at least one of plurality of dampers 21-24 is achieved by controlling a remotely adjustable valve which utilizes a relatively small solenoid (using relatively low amounts of power) to generate relatively large damping forces. Examples of such as active valve are described and shown in U.S. Pat. Nos. 9,120,362; 8,627,932; 8,857,580; 9,033,122; and 9,239,090 which are incorporated herein, in their entirety, by reference.

Referring still to FIG. 1, SDC 10 and modular electronic damping control system 100 provide for control of at least one of plurality of dampers 21-24 regardless of the cost, complexity, or structure of the at least one of plurality of dampers 21-24. As a result, significant cost savings can be attained by use of the present modular electronic damping control system 100. Specifically, embodiments of the present invention enable a customer to purchase a vehicle with introductory (e.g., lower cost) dampers and then upgrade to medium dampers or high end dampers to obtain desired performance characteristics. Moreover, embodiments of the present modular electronic damping control system 100 enable the customer to simply replace the current or existing dampers with new replacement dampers.

With reference still to the embodiment of FIG. 1, there is no requirement for HMI/GUI 14 to reside within modular electronic damping control system 100. Instead, in various embodiments of the present invention, the state or condition of suspension configuration is identified solely by the warning 13 or lack thereof. In various other embodiments of modular electronic damping control system 100, there are suspension configuration switches, not shown, instead of HMI/GUI 14.

Referring still to the embodiment of FIG. 1, optional HMI/GUI 14, of modular electronic damping control system 100, is a GUI that presents a damping configuration and operational information about the damping configuration, e.g., vehicle suspension settings, in a user interactive format, such as on a display located proximal to a vehicle operator. In one such embodiment, and where one or more of the plurality of dampers 21-24 is an active damper, HMI/GUI 14 presents damping configuration and operational information which indicates, for example, the damping characteristics (e.g., a soft or "comfort" damping setting, a firm or "sport"

damping setting, etc.) corresponding to each of the one or more active dampers. Furthermore, in an embodiment where one or more of plurality of dampers 21-24 is not an active damper, HMI/GUI 14 presents damping configuration and operational information which indicates, for example, the damping characteristics (e.g., damping stiffness, current state of compression or expansion, etc.) corresponding to each of the one or more not active dampers.

In another embodiment as depicted in FIG. 1, optional HMI/GUI 14 is an HMI configured to present vehicle suspension setting information in a user interactive format on a display. In one such embodiment, HMI/GUI 14 will have a touch input capability to receive an input from a user via a user interaction with the HMI of HMI/GUI 14. In such an embodiment, HMI of HMI/GUI 14 is also programmable to present damping configuration information, rebound configuration information, and/or suspension setting information in a user interactive format on a display. As with the above embodiment, where one or more of the plurality of dampers 21-24 is an active damper, HMI of HMI/GUI 14 presents damping configuration and operational information which indicates, for example, the damping characteristics (e.g., a soft or "comfort" damping setting, a firm or "sport" damping setting, etc.) corresponding to each of the one or more active dampers. Furthermore, in an embodiment where one or more of plurality of dampers 21-24 is not an active damper, HMI of HMI/GUI 14 presents damping configuration and operational information which indicates, for example, the damping characteristics (e.g., damping stiffness, current state of compression or expansion, etc.) corresponding to each of the one or more not active dampers.

With reference again to FIG. 1, in one embodiment as described above, the vehicle suspension setting information provided, for example, by HMI of HMI/GUI 14 includes a plurality of different vehicle suspension mode configurations and an identification of which configuration mode is currently active on the vehicle suspension. In one such embodiment, the plurality of different vehicle suspension mode configurations is user-selectable. In such an embodiment, a user can select from a plurality of different vehicle suspension mode configurations including, but not limited to, a "comfort" setting, a "sport" setting, and the like.

In one embodiment where one or more of plurality of dampers 21-24 are active dampers which are also automatically adjustable, control system 111 will automatically adjust at least one of the one or more of plurality of active automatically adjustable dampers of the tuned vehicle suspension based on external conditions such as, but not limited to, weather, terrain, ground type (e.g., asphalt, concrete, dirt, gravel, sand, water, rock, snow, etc.), and the like.

In another embodiment, where one or more of plurality of dampers 21-24 are active dampers which are also automatically adjustable, control system 111 will automatically adjust at least one of the one or more of plurality of active automatically adjustable dampers of the tuned vehicle suspension based on one or more sensor inputs received from sensors such as an inertial gyroscope, an accelerometer, a magnetometer, a steering wheel turning sensor, a single-spectrum camera, a multi-spectrum camera, and the like.

Referring still to FIG. 1, in embodiments of the present invention, characteristics of modular electronic damping control system 100 are selected in any one or more of various methods. For example, in some embodiments of the present invention, characteristics of modular electronic damping control system 100 are set at the factory. As another example, in various embodiments of the present invention, characteristics of modular electronic damping control system 100 are manually adjustable by a user. As yet another example of the present invention, in other embodiments, characteristics of modular electronic damping control system 100 are automatically adjustable by a computing device based upon inputs, such as, but not limited to, environmental-based inputs, vehicle-based inputs, or inputs from one or more of plurality of dampers 21-24. As another example, the suspension characteristics for one or more of plurality of dampers 21-24 are manually or automatically adjustable by modular electronic damping control system 100 based on user preference, vehicle speed, vehicle maneuvering actions, user-selected ride type, or the like. It should further be noted that in various embodiments of the present invention, characteristics of modular electronic damping control system 100 are defined based upon two or more of various inputs, including, but not limited to, two or more of the inputs provided above. In one such embodiment, a vehicle wheel speed transducer provides input corresponding to the speed of the vehicle. Wheel speed transducers are described in U.S. Pat. No. 3,986,118 which is incorporated herein by reference in its entirety.

With reference yet again to FIG. 1, in one embodiment, wherein adjustable characteristics for at least one of one or more of plurality of dampers 21-24 are manually adjustable via a user input, the user input is received by control system 111 via a user's interaction with HMI/GUI 14.

Also, in an embodiment, wherein the adjustable characteristics for the one or more of plurality of dampers 21-24 are automatically adjusted based on external conditions, such external conditions are received at control system 111 from, for example, sensors detecting shock, vibration sensors, or the like. For example, in one embodiment in which the vehicle is operating in a "smooth terrain" environment, e.g., riding on a highway or when the vehicle is operating on a smooth road, configuration adjustments are provided by the user via HMI/GUI 14, or automatically applied by modular electronic damping control system 100, to increase the firmness for the ride of the vehicle. That is, such an embodiment provides additional a damping characteristic with increased hardness or stiffness such that the obtained damping characteristic increases feedback for the vehicle and user, improves the "feel" of the ride, and results in improved and precise handling of the vehicle.

In contrast with the above described "smooth terrain" embodiment, in another embodiment, in which the vehicle is in a rough operating environment, e.g., riding "off-road" or when the vehicle is operating on a bumpy road, configuration adjustments are provided by the user via HMI/GUI 14, or automatically applied by modular electronic damping control system 100, to decrease the firmness for the ride of the vehicle. As one implementation example, when rougher terrain is encountered, the user will select a "rough terrain" setting at HMI/GUI 14. Again, in contrast to the "smooth terrain" embodiment described above, modular electronic damping control system 100 receives information from one or more sensors (for example, sensors coupled to the suspension at or near one or more of plurality of dampers 21-24) via Vehicle CAN Bus 8, or the like. Based upon the received information about the rough terrain, modular electronic damping control system 100 adjusts or "re-tunes" the vehicle suspension to a softer setting. That is, modular electronic damping control system 100 adjusts or "re-tunes" the vehicle suspension to provide appropriate suspension control characteristics for the vehicle. In such a "rough terrain" embodiment, adjustment provided by modular electronic damping control system 100 results in a softer ride for the vehicle. Such a softer ride reduces any operator/passenger felt vibrations, mitigates shock to the vehicle and operator/passenger, lessens the vehicle's movement resulting from interaction with bumps, and thereby reduces operator/passenger fatigue and wear on the vehicle.

Referring still to FIG. 1, as described herein, modular electronic damping control system 100 includes a manual operation mode. In a manual operation mode embodiment, modular electronic damping control system 100 includes a user interaction feature such as, but not limited to, a user-selectable switch, an icon on a touch display, or the like, provided to the user via HMI/GUI 14. The user interaction feature allows a user to manually control modular electronic damping control system 100, and ultimately obtain a desired damping characteristic for the vehicle. In one such embodiment, the user will manually control modular electronic damping control system 100 by making a "mode" or "ride-type" selection via HMI/GUI 14. In one such manual operation embodiment, the user's manual control of modular electronic damping control system 100 is based upon given terrain characteristics. For example, a user can select "highway" mode for smooth terrain, "off-road" mode for rough terrain, or even "mixed" mode for an intermediate type of terrain. In one embodiment, the manual option is entered, by a user, to modular electronic damping control system 100 through user interaction with HMI/GUI 14. In another embodiment, the manual option is entered, by a user, to modular electronic damping control system 100 through user interaction with one or more switches that allow the user to select one or more pre-defined suspension settings. For example, in various manual mode embodiments, the pre-defined suspension settings or modes can include, but are not limited to, "highway", "offroad", "mixed", "rock climbing", "racing", "performance", "sport", "comfort", "wet", and any of various other modes which might be desired by, or relevant to, a user of modular electronic damping control system 100.

With reference again to FIG. 1, in an automated mode, modular electronic damping control system 100 automatically adjusts one or more characteristics for one or more of plurality of dampers 21-24 based upon one or more inputs received at the processor of SDC 10. For example, in one such embodiment, input is generated which pertains to vehicle operating parameters such as, but not limited to, position and/or velocity of movement of the steering wheel, amount of vehicle roll, speed of the vehicle, use of the accelerator pedal, use of the brake pedal, and the like. In such an automated mode embodiment, the vehicle operating parameters are obtained and/or monitored via one or more sensors on or about the vehicle. Similarly, in some automated mode embodiments, external conditions such as weather, terrain, ground type, and the like, are also detected and/or monitored via one or more sensors on or about the vehicle. Sensors which are utilized in such and automated mode embodiment, can include, but are not limited to, accelerometers, sway sensors, suspension sensors, visual identification technology (e.g., a single-spectrum camera or a multi-spectrum camera), driver input monitors, steering wheel turning sensors, and the like. For example, in one automated mode embodiment, modular electronic damping control system 100 receives input from an inertial measurement unit (IMU) to sense the roughness of the terrain on which the vehicle is travelling. Further, in another automated mode embodiment, modular electronic damping control system 100 receives input from an attitude and heading reference system (AHRS) that provides 3D orientation integrating data coming from inertial gyroscopes, accelerometers, magnetometers, and the like. Further still, in yet another embodiment, the AHRS includes a GPS-aided Microelectromechanical Systems (MEMS)-based IMU and a static pressure sensor. It should further be noted that in various automated mode embodiments, modular electronic damping control system 100 will received two or more of various inputs, including, but not limited to, two or more of the inputs provided above.

Referring again to FIG. 1, in various embodiments of the present invention, when modular electronic damping control system 100 determines that at least one of one or more of plurality of dampers 21-24 are remotely adjustable, modular electronic damping control system 100 will adjust that at least one remotely adjustable damper automatically and "on-the-fly". For example, in one such embodiment, modular electronic damping control system 100 will set the at least one remotely adjustable damper into a "highway" mode when modular electronic damping control system 100 determines that the vehicle is travelling on a smooth roadway. In so doing, modular electronic damping control system 100, configures the at least one remotely adjustable damper to operate with a firmer damping characteristic. Continuing with such an embodiment, modular electronic damping control system 100 will set the at least one remotely adjustable damper into an "off-road" mode when modular electronic damping control system 100 determines that the vehicle is travelling on a bumpy surface. In so doing, modular electronic damping control system 100, configures the at least one remotely adjustable damper to operate with a softer damping characteristic. As a result, the vehicle, and, correspondingly, an operator/passenger of the vehicle, will experience a smoother ride.

In one embodiment of the present invention, user-selected settings are further adjustable by modular electronic damping control system 100 based on actual conditions. For example, if a vehicle operator initially manually sets modular electronic damping control system 100 to an "off-road" mode and then the vehicle transitions from a bumpy or rough terrain to smooth roadway, modular electronic damping control system 100 will determine (using, for example, received sensor feedback) that the vehicle is no longer in rough terrain, and modular electronic damping control system 100 will automatically change the mode from "rough" mode to "highway" mode to provide a more appropriate suspension setting. However, various embodiments of the present invention enable the operator to override any automatic adjustments so that the user's manually-selected mode off-road mode is maintained.

Referring now to FIG. 2, a perspective view 200 of an in-line damper with dependent compression and rebound adjust valve 212 for use in modular electronic damping control system 100 is shown in accordance with an embodiment. Although such a damper is shown in the embodiment of FIG. 2, embodiments of the present invention are well suited to use with various other types of dampers. Importantly, in the various embodiments of the present invention, SDC 10 of modular electronic control system 100, may include, or operate in conjunction with, manual dampers, active dampers, passive dampers, or any combination of such types of dampers.

In various embodiments of the present invention, SDC 10 will control each of plurality of dampers 21-24 located at each respective vehicle wheel suspension location, determine a type of damping component at each vehicle wheel suspension location, automatically tune a vehicle suspension based on the determined type of damping components at each vehicle wheel suspension location, automatically monitor plurality of dampers 21-24 and determine when a change has been made to one or more of plurality of dampers 21-24, and automatically re-tune the vehicle suspension based on the change to one or more of plurality of dampers 21-24.

In some embodiments of the present invention, SDC 10 will remotely control operation of at least one remotely-adjustable valving component disposed within at least one remotely-adjustable active damper of plurality of dampers 21-24 and thereby adjust the damping characteristics for that at least one remotely-adjustable active damper of plurality of dampers 21-24. Furthermore, in some embodiments of the present invention, SDC 10 will control the flow of damping fluid into and out of at least one of plurality of dampers 21-24 and thereby adjust the damping characteristics for that at least one of plurality of dampers 21-24. In various other embodiments of the present invention, SDC 10 will use a combination of controlling operation of at least one valving component within at least one of plurality of dampers 21-24, and controlling the flow of damping fluid into and out of at least one of plurality of dampers 21-24 to control and/or adjust the damping characteristics for that at least one of plurality of dampers 21-24.

Referring still to FIG. 2, SDC 10 and modular electronic damping control system 100 provide for control of at least one of plurality of dampers 21-24 (all of FIG. 1) regardless of the cost, complexity, or structure of the at least one of plurality of dampers 21-24. As a result, significant cost savings can be attained by use of the present modular electronic damping control system 100. Specifically, embodiments of the present invention enable a customer to purchase a vehicle with introductory (e.g., lower cost) dampers and then upgrade to medium dampers (mid-priced) or high-end dampers (often significantly more expensive than introductory or medium dampers) to obtain desired performance characteristics. Moreover, embodiments of the present modular electronic damping control system 100 enable the customer to simply replace the current or existing dampers with new replacement dampers.

With reference now to FIG. 3, a perspective view 300 of an in-line damper for use in conjunction with modular electronic damping control system 100 is shown in accordance with an embodiment of the present invention. As stated above, although such a damper is shown in the embodiment of FIG. 3, embodiments of the present invention are well suited to use with various other types of dampers. Importantly, in the various embodiments of the present invention, SDC 10 of modular electronic control system 100, may include, or operate in conjunction with, manual dampers, active dampers, passive dampers, or any combination of such types of dampers. Further, in some embodiments of the present invention, the damping characteristic of at least one of plurality of dampers 21-24 is achieved by controlling damper based upon a current state or condition of the damper itself. For example, in some embodiments of the present invention, a piston's position within the damping chamber of a damper is determined using an accelerometer to sense modal resonance of the damper. Such resonance will change depending on the position of the piston and an on-board processor (computer) is calibrated to correlate resonance with axial position. In one embodiment, a suitable proximity sensor or linear coil transducer or other electro-magnetic transducer is incorporated in the damping chamber of the damper to provide a sensor to monitor the position and/or speed of the piston (and suitable magnetic tag) with respect to a housing of the damper. In one such embodiment, the magnetic transducer includes a waveguide and a magnet, such as a doughnut (toroidal) magnet that is joined to the damper cylinder and oriented such that the magnetic field generated by the magnet passes through the rod and the waveguide. Electric pulses are applied to the waveguide from a pulse generator that provides a stream of electric pulses, each of which is also provided to a signal processing circuit for timing purposes. When the electric pulse is applied to the waveguide, a magnetic field is formed surrounding the waveguide. Interaction of this field with the magnetic field from the magnet causes a torsional strain wave pulse to be launched in the waveguide in both directions away from the magnet. A coil assembly and sensing tape is joined to the waveguide. The strain wave causes a dynamic effect in the permeability of the sensing tape which is biased with a permanent magnetic field by the magnet. The dynamic effect in the magnetic field of the coil assembly due to the strain wave pulse, results in an output signal from the coil assembly that is provided to the signal processing circuit along signal lines. By comparing the time of application of a particular electric pulse and a time of return of a sonic torsional strain wave pulse back along the waveguide, the signal processing circuit can calculate a distance of the magnet from the coil assembly or the relative velocity between the waveguide and the magnet. The signal processing circuit provides an output signal, which is digital or analog, proportional to the calculated distance and/or velocity. A transducer-operated arrangement for measuring piston rod speed and velocity in a damper is described in U.S. Pat. No. 5,952,823 and that patent is incorporated by reference herein in its entirety.

Figure 4:
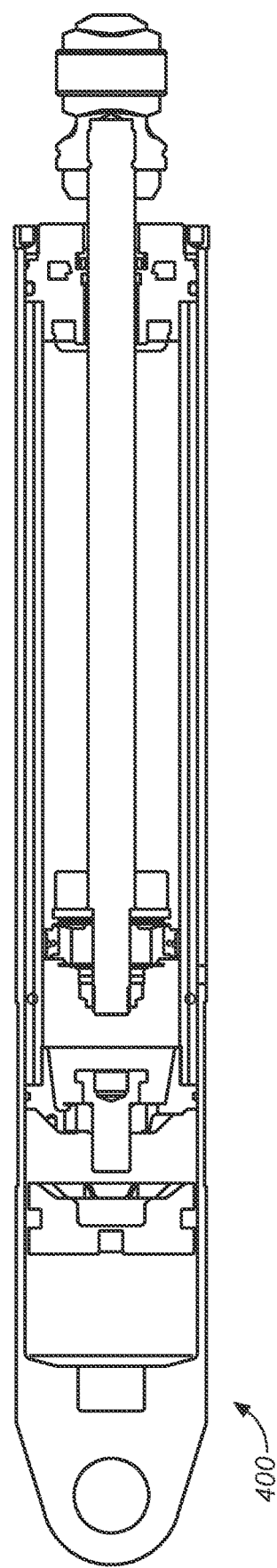
FIG. 4 is a cutaway view of a damper for use in the modular electronic damping control system, in accordance with an embodiment.

Referring now to FIG. 4, a cutaway view 400 of a damper for use in modular electronic damping control system 100 is shown in accordance with one embodiment of the present invention. More specifically, in one embodiment, damper 400 would be a 2.5 base valve+internal bypass, based on hypothetical performance series 2.5 impact body. As stated above, although such a damper is shown in the embodiment of FIG. 3, embodiments of the present invention are well suited to use with various other types of dampers. Importantly, in the various embodiments of the present invention, SDC 10 of modular electronic control system 100, may include, or operate in conjunction with, manual dampers, active dampers, passive dampers, or any combination of such types of dampers.

Figure 5:
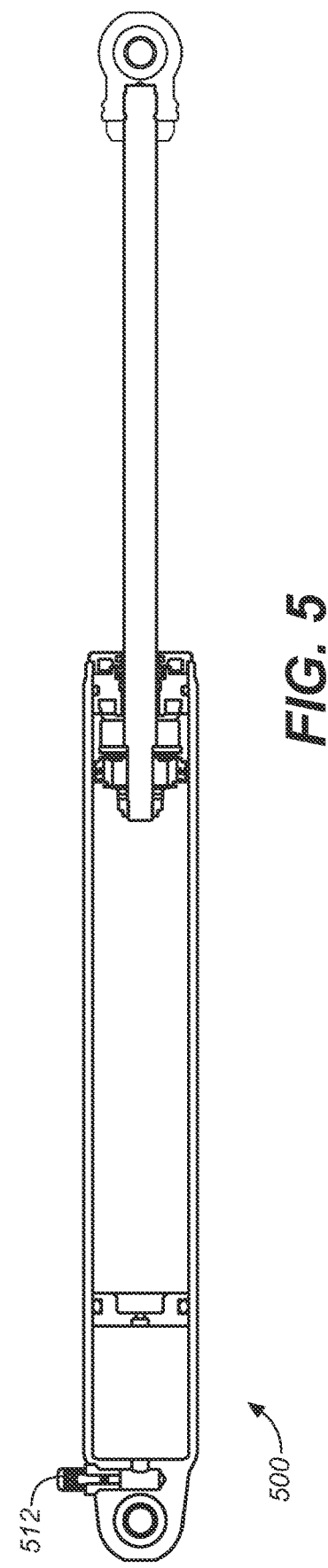
FIG. 5 is a cutaway view of a damper for use in the modular electronic damping control system, in accordance with an embodiment.

With reference now to FIG. 5, a cutaway view 500 of yet another damper for use in the modular electronic damping control system 100 is shown in accordance with an embodiment of the present invention. In one embodiment, damper 500 is a low cost performance series 2.0 impact body shock. In one embodiment, damper 500 includes a valve 512 that allows a pressure within the damper to be manually or automatically adjusted. For example, in one embodiment, valve 512 is manually adjusted by connecting a bicycle pump (or the like) to the valve and adding or removing air. In another embodiment, valve 512 is automatically adjustable by coupling valve 512 with an automatic air supply, such as an onboard air generator, or the like. As stated above, although such a damper is shown in the embodiment of FIG. 5 embodiments of the present invention are well suited to use with various other types of dampers. Importantly, in the various embodiments of the present invention, SDC 10 of modular electronic control system 100, may include, or operate in conjunction with, manual dampers, active dampers, passive dampers, or any combination of such types of dampers.

Figure 6:
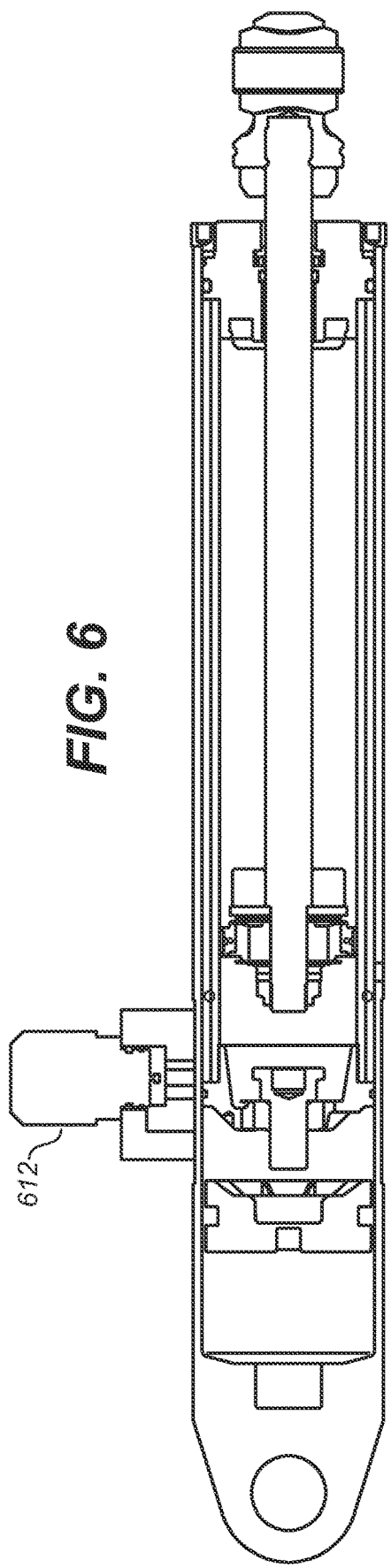
FIG. 6 is a cutaway view of a damper with a single compression or rebound adjuster for use in the modular electronic damping control system, in accordance with an embodiment.

Referring now to FIG. 6, a cutaway view 600 of a damper with a single compression or rebound adjuster 612 for use in modular electronic damping control system 100 is shown in accordance with an embodiment of the present invention. One example of adjuster 612 is a stepper motor compression adjuster (e.g., a digressive base valve with a stepper motor-controlled base valve bleed). Again, although such a damper is shown in the embodiment of FIG. 6, embodiments of the present invention are well suited to use with various other types of dampers. Importantly, in the various embodiments of the present invention, SDC 10 of modular electronic control system 100, may include, or operate in conjunction with, manual dampers, active dampers, passive dampers, or any combination of such types of dampers.

Figure 7:
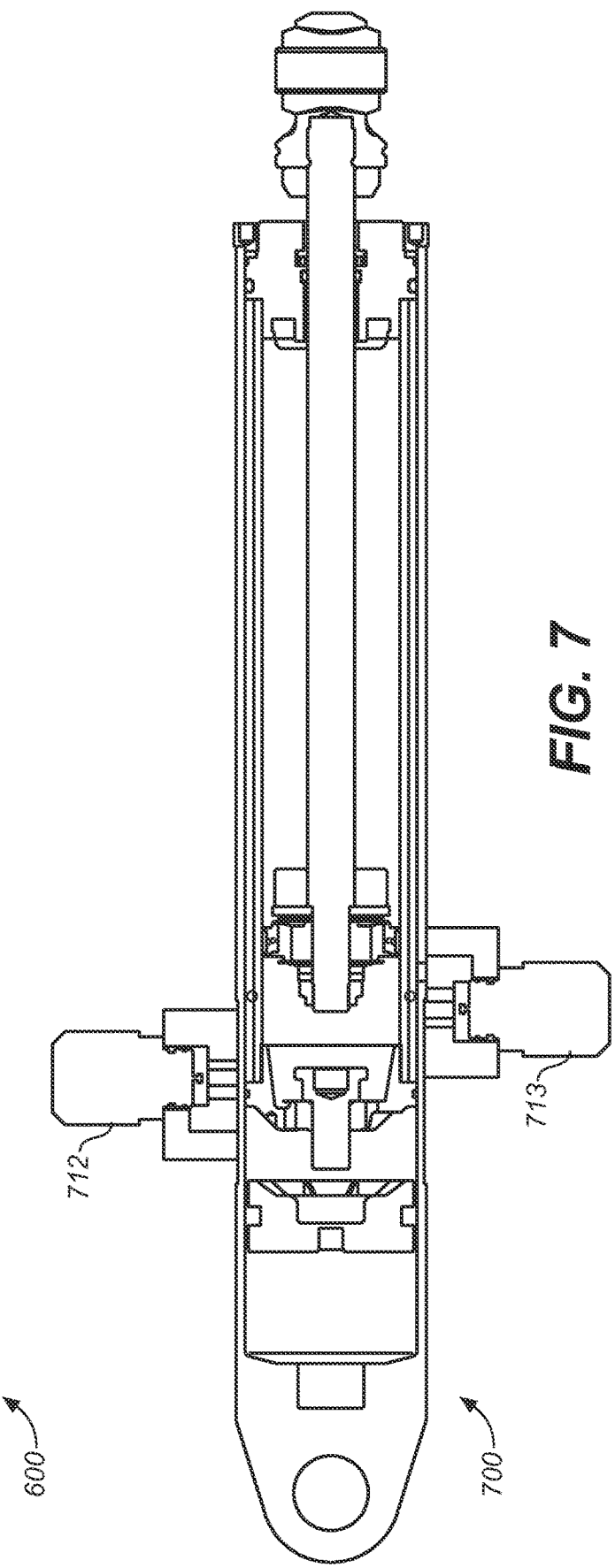
FIG. 7 is a cutaway view of a damper with dual adjustors for adjusting both compression and rebound for use in the modular electronic damping control system, in accordance with an embodiment.

With reference now to FIG. 7, a cutaway view 700 of a damper with dual adjustors for adjusting both compression and rebound for use in modular electronic damping control system 100 is shown in accordance with an embodiment of the present invention. For example, in the embodiment of FIG. 7, adjustor 712 is used for adjusting compression, and adjustor 713 is used for adjusting rebound. As stated above, the adjustors 712 and 712 may be manually, automatically, or both manually and automatically adjustable. One example of dual adjustors 712 and 712 is a dual stepper. As stated above, although such a damper is shown in the embodiment of FIG. 7, embodiments of the present invention are well suited to use with various other types of dampers. Importantly, in the various embodiments of the present invention, SDC 10 of modular electronic control system 100, may include, or operate in conjunction with, manual dampers, active dampers, passive dampers, or any combination of such types of dampers.

Referring now to FIG. 8, a perspective view 800 of a damper with a piggyback 815 for use in modular electronic damping control system 100 is shown in accordance with an embodiment of the present invention. In general, piggyback 815 is a reservoir that allows the storage of additional damper fluid for a number of reasons, such as, but not limited to, heat transfer and the like. Further, piggyback 815 and may also include additional damping features and characteristics. A configuration of a side reservoir, or piggyback, including a floating piston, is described in U.S. Pat. No. 7,374,028 which patent is incorporated herein by reference in its entirety. As stated above, although such a damper is shown in the embodiment of FIG. 8, embodiments of the present invention are well suited to use with various other types of dampers. Importantly, in the various embodiments of the present invention, SDC 10 of modular electronic control system 100, may include, or operate in conjunction with, manual dampers, active dampers, passive dampers, or any combination of such types of dampers.

With reference now to FIG. 9, a perspective view 900 of a damper with a piggyback 915 and a spring 921 for use in modular electronic damping control system 100 is shown in accordance with an embodiment of the present invention. As stated above, although such a damper is shown in the embodiment of FIG. 9, embodiments of the present invention are well suited to use with various other types of dampers. In some embodiments, the damper may also include a bottom out feature, as is described in U.S. Pat. No. 8,550,223 which patent is incorporated herein by reference in its entirety. Importantly, in the various embodiments of the present invention, SDC 10 of modular electronic control system 100, may include, or operate in conjunction with, manual dampers, active dampers, passive dampers, or any combination of such types of dampers.

Another configuration suitable for use as at least one of plurality of dampers 21-24 is a small bore damper with a stepper adjust (such as, for example, a 2.0 inch monotube or piggyback damper that uses a ⅝ inch shaft, but when combined with ⅞ inch shaft, the adjustment range for such a damper is considerable. Although such a damper is mentioned here, embodiments of the present invention are well suited to use with various other types of dampers. Importantly, in the various embodiments of the present invention, SDC 10 of modular electronic control system 100, may include, or operate in conjunction with, manual dampers, active dampers, passive dampers, or any combination of such types of dampers.

Yet another damper configuration suitable for use as at least one of plurality of dampers 21-24 is a small bore shock with hydraulic preload adjust such as a 1.5 inch or 2.0 inch monotube or piggyback damper. A further configuration suitable for use as at least one of plurality of dampers 21-24 is a small bore shock with a fast acting, remotely-adjustable valve, 2.0 inch piggyback, and ⅞ inch shaft for providing a large adjustment range. Moreover, although a plurality of dampers is described, it should be appreciated that there may be other dampers and damper valve and component arrangements that fall within the scope of the attached Claims.

In one embodiment, one or more of plurality of dampers 21-24 is also modular in design. For example, in-line damper 300 of FIG. 3 may be manufactured with a port to allow the addition of a piggyback 815 as shown in FIG. 8; or one or more openings will be plugged in damper 400 of FIG. 4, such that one or more adjustment valves such as 712 and 713 of FIG. 7 can be added to transform damper 400 into damper 700 with minimal remanufacturing; possibly even by an at home Do-It-Yourself (DIY) mechanic.

As a recap, embodiments of the present claimed invention pertain to a modular electronic damping control system 100. By being modular, modular electronic damping control system 100 is capable of determining a type of damping component at each vehicle wheel suspension location and automatically tune a vehicle suspension based on the determined type of damping component at each vehicle wheel suspension location. In addition, the control system automatically monitors one or more of plurality of dampers 21-24 and determines when a change has been made to one or more of plurality of dampers 21-24. When it is determined that a change to one or more of plurality of dampers 21-24 has occurred, modular electronic control system 100 automatically re-tunes the vehicle suspension based on the change of one or more of plurality of dampers 21-24.

Also, for various reason provided above, because modular electronic damping control system 100 is modular, significant cost savings can be attained. Moreover, because of the interchangeable and automatic recognition of the dampers on the vehicle, modular electronic damping control system 100 provides significant opportunities for both manufacturer and aftermarket modification of the vehicle. For example, embodiments of the present invention enable a customer to purchase a vehicle with introductory dampers and then upgrade to medium dampers or high end dampers to obtain desired performance characteristics. Moreover, embodiments of present modular electronic damping control system 100 enable the customer to simply replace the current or existing dampers with new replacement dampers, and, in various embodiments of the present invention, the capabilities of the new replacement dampers are automatically determined by modular electronic damping control system 100.

It should be noted that any of the features disclosed herein are useful alone or in any suitable combination. While the foregoing is directed to embodiments of the present invention, other and further embodiments of the invention is

What I claim is:

1. A modular electronic damping control system comprising:
   at least one damping component located at a vehicle suspension location;
   a piggyback reservoir fluidically coupled with said at least one damping component, said piggyback reservoir comprising:
      a reservoir configured to receive damping fluid from and transfer said damping fluid to said at least one damping component;
      a fluid volume; and
      a floating piston moveably separating said reservoir and said fluid volume; and
   a control system configured to control said at least one damping component located at said vehicle suspension location, said control system configured to determine a type of at least one damping component, said control system configured to automatically tune a vehicle suspension for a vehicle based on a determined type of said at least one damping component, and wherein said control system is further configured to automatically monitor said at least one damping component and determine when a change has been made to said at least one damping component, and said control system configured to automatically re-tune said vehicle suspension based on said change to said at least one damping component.

2. The modular electronic damping control system of claim 1, further comprising:
   a graphical user interface (GUI) for presenting damping configuration and operation information in a user interactive format.

3. The modular electronic damping control system of claim 1, further comprising:
   a human machine interface (HMI) configured to present vehicle suspension setting information in a user interactive format on a display, said HMI comprising:
      a touch input capability configured to receive an input from a user via a user interaction with said HMI.

4. The modular electronic damping control system of claim 3, wherein said vehicle suspension setting information comprises:
   a plurality of vehicle suspension mode configurations; and
   an identification of which of said vehicle suspension mode configurations is currently active on said vehicle.

5. The modular electronic damping control system of claim 4, wherein said plurality of vehicle suspension mode configurations is user-selectable.

6. The modular electronic damping control system of claim 1, further comprising:
   a human machine interface (HMI) configured to present damping configuration information in a user interactive format on a display, said HMI comprising:
      a touch input capability to receive an input from a user via a user interaction with said HMI.

7. The modular electronic damping control system of claim 1, further comprising:
   a human machine interface (HMI) configured to present rebound configuration information and vehicle suspension setting information in a user interactive format on a display, said HMI comprising a touch input capability to receive an input from a user via a user interaction with said HMI.

8. The modular electronic damping control system of claim 1, wherein said control system is configured to automatically adjust said at least one damping component based on external conditions selected from the group consisting of: weather, terrain, and ground type.

9. The modular electronic damping control system of claim 1, wherein said control system is configured to automatically adjust said at least one damping component based on one or more sensor inputs received from the group consisting of: an inertial gyroscope, an accelerometer, a magnetometer, a steering wheel turning sensor, a single-spectrum camera, and a multi-spectrum camera.

10. The modular electronic damping control system of claim 1, wherein said at least one damping component is selected from the group consisting of: an in-line damper, a compression adjust only damper, a rebound adjust only damper, an independent compression and rebound adjust damper, and a dependent compression and rebound adjust single-valve damper.

11. The modular electronic damping control system of claim 1, wherein said at least one damping component comprises:
    a remotely-adjustable valve.

12. The modular electronic damping control system of claim 11, wherein said remotely-adjustable valve includes a component selected from the group consisting of: a stepper motor, a fast-acting solenoid, a flow control solenoid, and a pressure control solenoid.

13. The modular electronic damping control system of claim 1, wherein said at least one damping component is selected from the group consisting of: a manual damper, an active damper and a passive damper.

14. The modular electronic damping control system of claim 1, wherein said at least one damping component further comprises:
    a bottom out feature.

* * * * *